Figure 3:
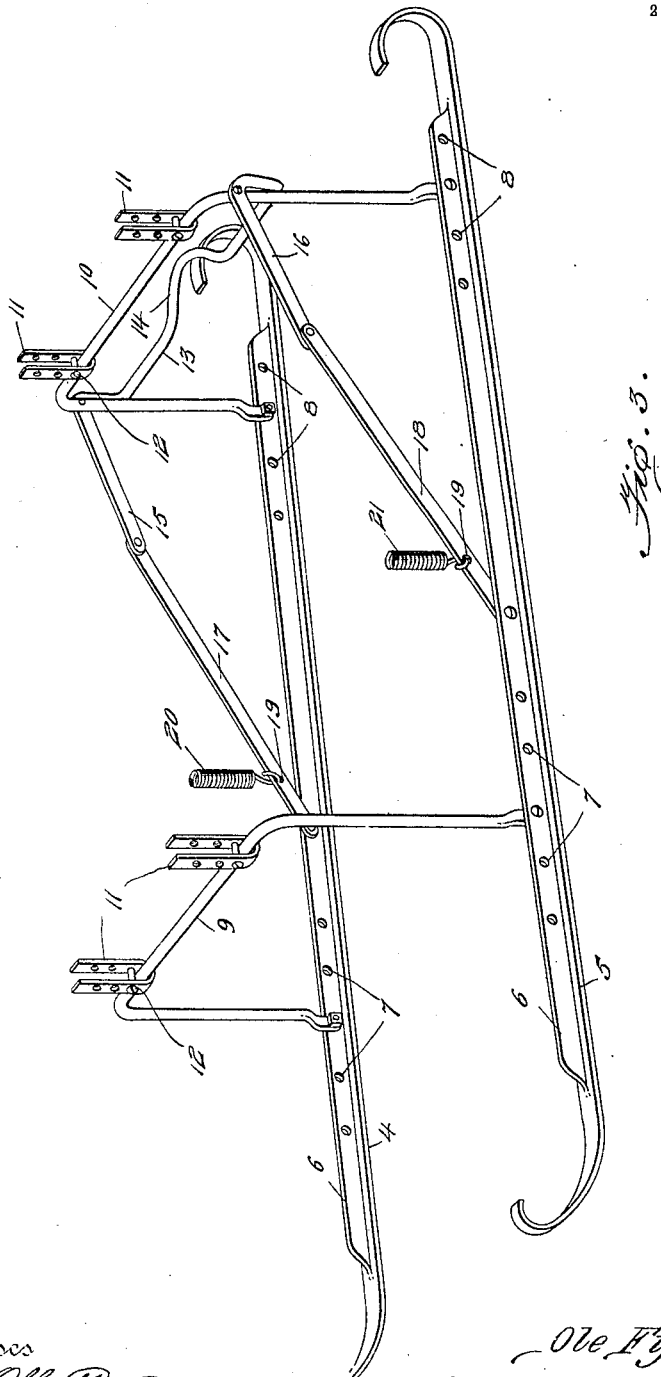

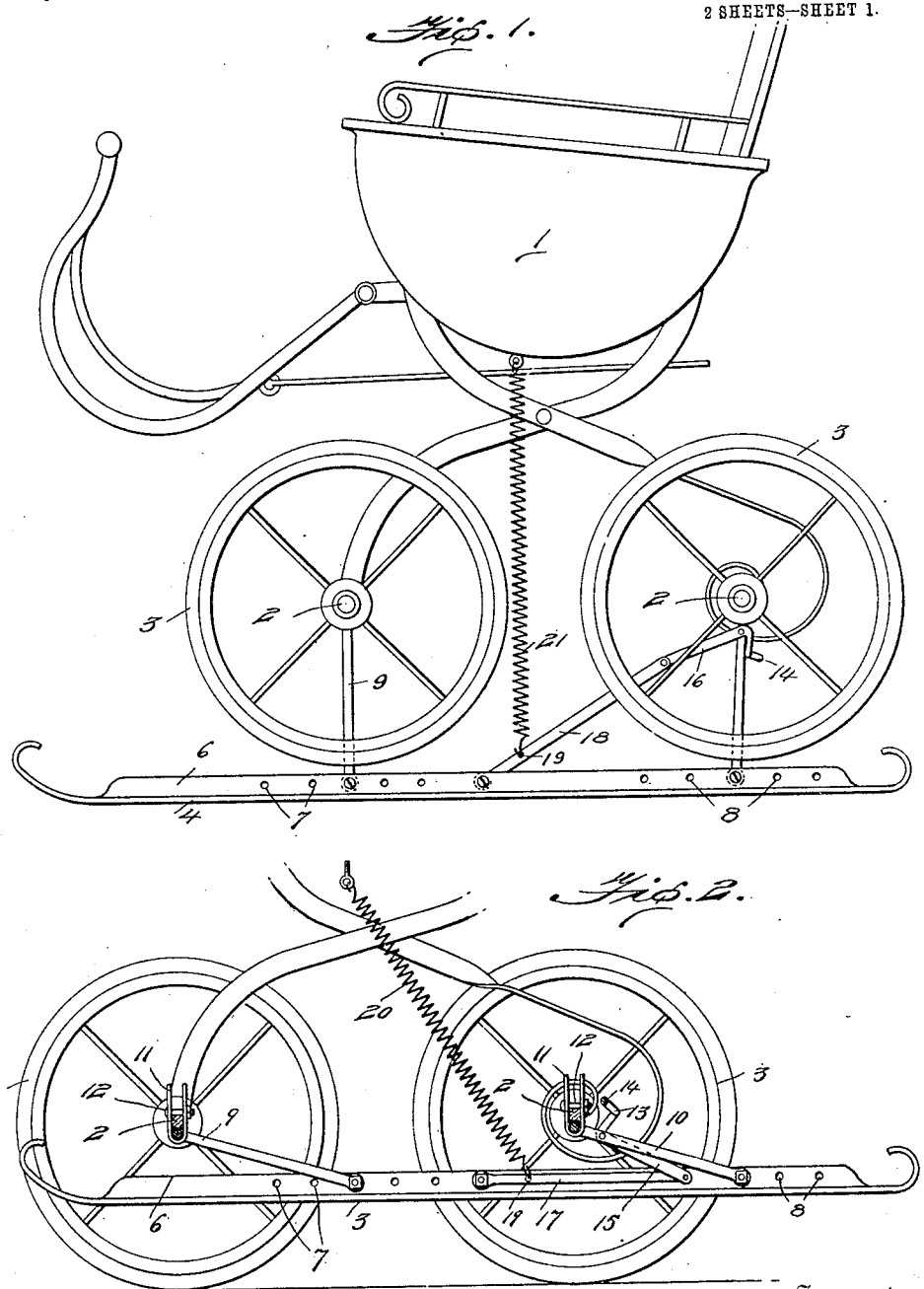

O. FYLLING.
RUNNER ATTACHMENT FOR BABY CARRIAGES.
APPLICATION FILED APR. 30, 1908.

906,701.

Patented Dec. 15, 1908.
2 SHEETS—SHEET 2.

Witnesses
B. M. Offutt
C. H. Giesbauer

Inventor
Ole Fylling
By H. B. Willson &co
Attorneys

UNITED STATES PATENT OFFICE.

OLE FYLLING, OF CROOKSTON, MINNESOTA.

RUNNER ATTACHMENT FOR BABY-CARRIAGES.

No. 906,701.　　　　Specification of Letters Patent.　　　Patented Dec. 15, 1908.

Application filed April 30, 1908.　Serial No. 430,232.

*To all whom it may concern:*

Be it known that I, OLE FYLLING, a citizen of the United States, residing at Crookston, in the county of Polk and State of Minnesota, have invented certain new and useful Improvements in Runner Attachments for Baby-Carriages; and I do declare the following to be a full, clear, and exact description of the invention, such as will enable others skilled in the art to which it appertains to make and use the same.

This invention relates to new and useful improvements in runner attachments for baby carriages or other analogous wheeled vehicles and has for its object to provide simple and efficient means for raising and lowering the runners to permit the vehicle to be converted into a sleigh when desired.

With this and other objects in view, the invention consists of certain novel features of construction, combination and arrangement of parts, as will be more fully described and particularly pointed out in the appended claims.

In the accompanying drawings Figure 1 is a side elevation of a baby carriage having this improved attachment applied and in lowered position ready for use; Fig. 2 is a longitudinal section thereof showing the runner attachment in raised position; Fig. 3 is a perspective view of this improved attachment detached and with the operating mechanism in operative position.

In the embodiment illustrated, a baby carriage 1 is shown of ordinary construction having the usual axles and wheels 2 and 3 respectively.

This improved sleigh attachment as shown comprises two runners 4 and 5 provided with the usual upright webs or flanges as 6 projecting from the upper face thereof and provided at their front ends with a plurality of longitudinally spaced apertures as 7 to provide for their connection with vehicles having axles spaced at varying distances apart. Similar apertures 8 are also provided at the rear ends of the runners for a similar purpose. U-shaped members 9 and 10 are pivotally connected at their free ends with the apertured webs 6 of the runners at their front and rear ends respectively. These U-shaped members 9 and 10 are detachably connected with the front and rear axles as 2 by any suitable means. The means shown comprises U-shaped clips 11 having the legs thereof provided with a plurality of longitudinally spaced registering apertures through which bolts as 12 are adapted to pass for connecting the members 9 and 10 to the axles. The plurality of spaced apertures formed in said clips 11 are designed to adapt the device for attachment to vehicles having wheels of different heights.

The operating means for this runner attachment comprises a rod 13 having a crank handle 14 formed intermediate of its ends for a purpose to be described. The ends of this rod 13 are bent at right angles thereto and then bent again and extend forwardly to form L-shaped members 15 and 16 which are pivotally connected preferably at the bend therein to the inner ends of the legs of the U-shaped member 10. Links 17 and 18 are pivotally connected at one end with the free ends of these L-shaped members 15 and 16 and at their other ends are pivotally connected with the webs 6 of the runners preferably at a point mid-way the length thereof. These links 17 and 18 are provided with apertures as 19 to receive the hooked end of coiled pull springs 20 and 21 which are connected at their other ends with the body of the vehicle and are designed to hold the attachment in elevated position when it is not desired for use, and to prevent collapsing of the supporting members when in operative position. The crank rod 13 is made slightly longer than the space between the legs of the member 10 and is adapted to bear thereagainst when the runners are in lowered position to hold and brace the U-shaped member 10 in upright position and limit its rearward movement.

When it is desired to use the vehicle as a sleigh the foot of the operator is pressed on the heel of one of the runners and the handle 14 is raised and a backward pull exerted thereon which through the link and rod mechanism raises the members 9 and 10 into upright position causing the runners 4 and 5 to drop down below the wheels as 3 and the device is ready for use. To throw the runner attachment into inoperative position the operator presses his toes under the iron rod 13 and draws backward slightly thereon which causes the the rod arms to fold downwardly at their point of pivotal connection with the links and draws said runners into raised or inoperative position.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

I claim as my invention:

1. A sleigh runner attachment for vehicles comprising runners, inverted U-shaped members for detachable connection with the axles of the vehicle and pivotally connected at the free ends to said runners, a rod having crank arms at its opposite ends said arms being pivotally connected with the legs of one of said inverted U-shaped members near their inner ends, links pivotally connected at one end with the free ends of said arms and at their other ends with said runners.

2. A sleigh runner attachment for vehicles comprising runners, inverted U-shaped members for detachable connection with the axles of the vehicle and pivotally connected at their free ends to said runners, a rod having crank arms at its opposite ends said arms being pivotally connected with the legs of one of said inverted U-shaped members near their inner ends, links pivotally connected at one end with the free ends of said arms and at their other ends with said runners, and pull springs connected at one end with said links and adapted to be connected at their other ends to the vehicle body.

3. A sleigh runner attachment for vehicles comprising runners, inverted U-shaped members for detachable connection with the axles of a vehicle and pivotally connected at their free ends to said runners, a rod having crank arms at its opposite ends said arms being pivotally connected with the legs of one of said inverted U-shaped members, a handle member formed on said rod and links pivotally connected at one end with the free ends of said arms and at their other ends with said runners.

In testimony whereof I have hereunto set my hand in presence of two subscribing witnesses.

OLE FYLLING.

Witnesses:
C. M. ANDERSON,
M. G. SELVIK.